United States Patent
Guo et al.

(10) Patent No.: US 12,260,889 B1
(45) Date of Patent: Mar. 25, 2025

(54) MAGNETIC RECORDING MEDIA WITH SACRIFICIAL LAYER AND CORRESPONDING ETCHING PROCESSES TO MINIMIZE HEAD TO MEDIA SPACING

(71) Applicant: Western Digital Technologies, Inc., San Jose, CA (US)

(72) Inventors: Wei Guo, Santa Clara, CA (US); Ge Xu, San Jose, CA (US)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 18/386,936

(22) Filed: Nov. 3, 2023

(51) Int. Cl.
*G11B 5/66* (2006.01)
*G11B 5/00* (2006.01)
*G11B 5/73* (2006.01)
*G11B 5/84* (2006.01)

(52) U.S. Cl.
CPC ............ *G11B 5/66* (2013.01); *G11B 5/7375* (2019.05); *G11B 5/7379* (2019.05); *G11B 5/84* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 5,614,314 A | * | 3/1997 | Itoh | G11B 5/727 428/408 |
| 5,776,602 A | * | 7/1998 | Ueda | G11B 5/7268 428/835.2 |
| 6,682,807 B2 | * | 1/2004 | Lairson | C23C 16/26 428/408 |
| 8,338,007 B2 | * | 12/2012 | Kimura | G11B 5/851 428/836 |
| 8,559,136 B1 | * | 10/2013 | Matsumura | G11B 5/255 428/833.2 |
| 8,721,903 B2 | | 5/2014 | Bian et al. | |
| 8,900,465 B1 | | 12/2014 | Yun et al. | |

(Continued)

OTHER PUBLICATIONS

Tsai, Jai-Lin et al., "Surface Modification of FePt(Ag, C) Granular Film by Ultrathin B4C Capping Layer", ScienceDirect: Applied Surface Science; vol. 509; Apr. 15, 2020; https://www.sciencedirect.com/science/article/abs/pii/S0169433220300933; 6 pages.

*Primary Examiner* — Kevin M Bernatz
(74) *Attorney, Agent, or Firm* — LOZA & LOZA, LLP; Gabriel Fitch

(57) ABSTRACT

Various apparatuses, systems, methods, and media are disclosed to provide a heat-assisted magnetic recording (HAMR) medium that includes a sacrificial layer and corresponding etching processes to minimize head to media spacing. The medium may include the sacrificial layer and a capping layer where each of the layers is etched to reduce roughness. The sacrificial layer is configured to ensure an etch rate that allows for selective etching and may be deposited on the capping layer and after etching, may remain along grain boundaries of the capping layer. The remaining portions of the sacrificial layer may form a discontinuous layer, including layer segments positioned along grain boundaries of the capping layer. The sacrificial layer may be made of non-magnetic materials different from the materials of the capping layer or materials of an overcoat layer deposited on the etched capping layer.

19 Claims, 10 Drawing Sheets

(56) References Cited

U.S. PATENT DOCUMENTS

| | | | |
|---|---|---|---|
| 9,318,140 B2 * | 4/2016 | Choe | G11B 5/84 |
| 9,324,353 B2 | 4/2016 | Hellwig et al. | |
| 9,558,777 B2 * | 1/2017 | Hellwig | G11B 5/672 |
| 9,940,963 B1 | 4/2018 | Tang | |
| 11,011,203 B1 * | 5/2021 | Chang | G11B 5/708 |
| 2007/0087227 A1 | 4/2007 | Ma et al. | |
| 2010/0092802 A1 | 4/2010 | Ma et al. | |
| 2011/0043941 A1 * | 2/2011 | Champion | G11B 5/7375 360/59 |
| 2012/0147718 A1 * | 6/2012 | Hellwig | G11B 5/7375 360/110 |
| 2016/0148633 A1 * | 5/2016 | Hasegawa | G11B 5/82 428/835.3 |
| 2018/0005658 A1 * | 1/2018 | Zhang | G11B 5/7268 |
| 2023/0078748 A1 | 3/2023 | Ikeda | |

* cited by examiner

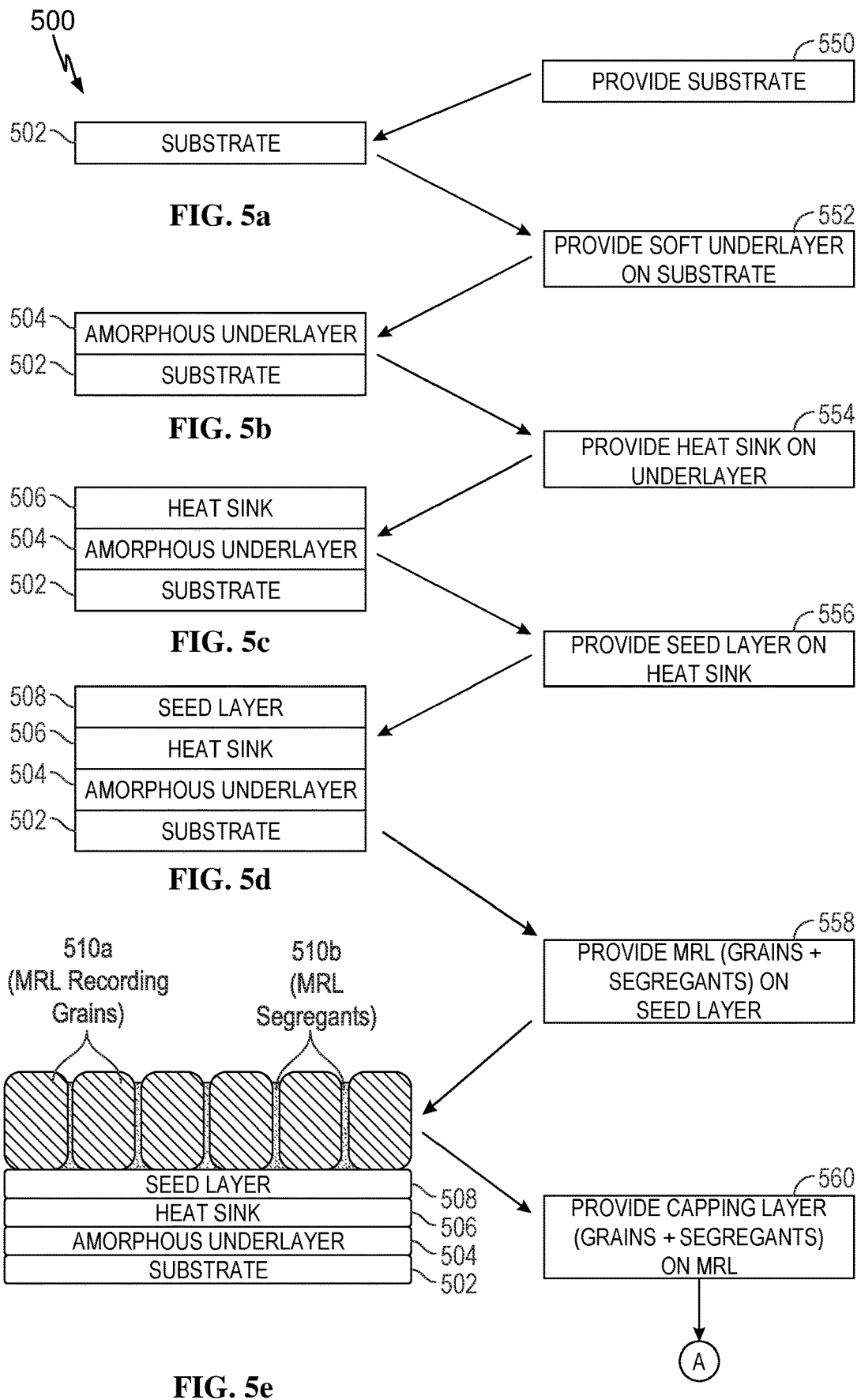

MAGNETIC RECORDING MEDIA WITH SACRIFICIAL LAYER AND CORRESPONDING ETCHING PROCESSES TO MINIMIZE HEAD TO MEDIA SPACING

FIELD

The disclosure relates, in some aspects, to magnetic recording media. More specifically, but not exclusively, the disclosure relates to magnetic recording media configured with a sacrificial layer and corresponding etching processes to minimize head to media spacing.

INTRODUCTION

Magnetic storage systems, such as a hard disk drive (HDD), are utilized in a wide variety of devices in stationary and mobile computing environments. Examples of devices that incorporate magnetic storage systems include desktop computers, portable notebook computers, portable hard disk drives, high-definition television (HDTV) receivers, television set top boxes, video game consoles, and portable media players.

A typical disk drive includes magnetic storage media in the form of one or more flat disks. The disks are generally formed of a few main substances, namely, a substrate material that gives it structure and rigidity, a magnetic recording layer that holds the magnetic impulses or moments that store digital data, and media overcoat and lubricant layers to protect the magnetic recording layer. The typical disk drive also includes a read head and a write head, generally in the form of a magnetic transducer which can sense and/or change the magnetic moments stored on the recording layer of the disks.

Heat assisted magnetic recording (HAMR) systems can increase the areal density of information recorded magnetically on various magnetic media. To achieve higher areal density for magnetic storage, smaller magnetic grain sizes, e.g., less than 6 nanometers (nm), may be required. In HAMR, high temperatures are applied to the media during writing to facilitate recording to small magnetic grains. The high temperatures may be achieved using a near field transducer that is coupled to a laser diode of a slider within a HAMR disk drive.

A smooth media interface is important for achieving high areal density and reducing fly height. In the case of HAMR media, the magnetic grain topology grown at high temperatures is generally not smooth. The capping layer and the carbon overcoat conform to the media grain structure beneath it, resulting in relatively high roughness (e.g., about 6-8 Angstrom) at the media interface. As a result, more carbon overcoat (e.g., increased thickness) is required to ensure the media has sufficient smoothness to pass standard media performance benchmarks. In which case, the magnetic spacing (distance between recording layer grains and magnetic head) is made relatively large by use of the thick carbon overcoat, and the recording performance is significantly degraded. Aspects of the present disclosure are directed to addressing these or other issues.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one aspect, the disclosure provides a magnetic recording medium comprising a substrate; a heat sink layer on the substrate; a magnetic recording layer (MRL) on the heat sink layer, the MRL comprising a plurality of recording grains separated by a segregant at grain boundaries of the plurality of recording grains; a capping layer on the MRL and comprising a magnetic material at positions corresponding to the plurality of recording grains and a capping segregant at positions corresponding to the grain boundaries; and a sacrificial layer embedded in the capping layer at positions corresponding to the grain boundaries, the sacrificial layer comprising a non-magnetic material different from the capping segregant, wherein a top surface of the capping layer and a top surface of the sacrificial layer are substantially coplanar.

In another aspect, the disclosure provides a magnetic recording medium comprising: a substrate; a heat sink layer on the substrate; a magnetic recording layer (MRL) on the heat sink layer, the MRL comprising a plurality of recording grains separated by a segregant at grain boundaries of the plurality of recording grains; a capping layer on the MRL and comprising a magnetic material disposed on each of the plurality of recording grains and another material disposed at the grain boundaries; a discontinuous sacrificial layer comprising a plurality of segments, each on the capping layer at positions corresponding to the grain boundaries, the sacrificial layer comprising a material different from the materials of the capping layer; an overcoat layer on the capping layer; and a lubricant layer on the overcoat layer.

In another aspect, the disclosure provides a method for fabricating a magnetic recording medium, the method comprising: providing a substrate; providing a heat sink layer on the substrate; providing a magnetic recording layer (MRL) on the heat sink layer; providing a capping layer on the MRL and comprising a magnetic material; providing a sacrificial layer on the capping layer and comprising a material different from the magnetic material of the capping layer; etching the sacrificial layer and portions of the capping layer; and providing an overcoat layer on the etched sacrificial layer and the etched portions of the capping layer.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations, it should be understood that such implementations can be implemented in various devices, systems, and methods.

BRIEF DESCRIPTION OF THE DRAWINGS

A more particular description is included below with reference to specific aspects illustrated in the appended drawings. Understanding that these drawings depict only certain aspects of the disclosure and are not therefore to be considered to be limiting of its scope, the disclosure is described and explained with additional specificity and detail through the use of the accompanying drawings, in which:

FIGS. 5a-5i illustrate a sequence of cross-sectional views of a magnetic media workpiece, and corresponding actions performed on the magnetic media workpiece in a process for reducing the surface roughness of the magnetic media using selective etching of the sacrificial layer and capping layer in accordance with an aspect of the disclosure.

DETAILED DESCRIPTION

Figure 1:
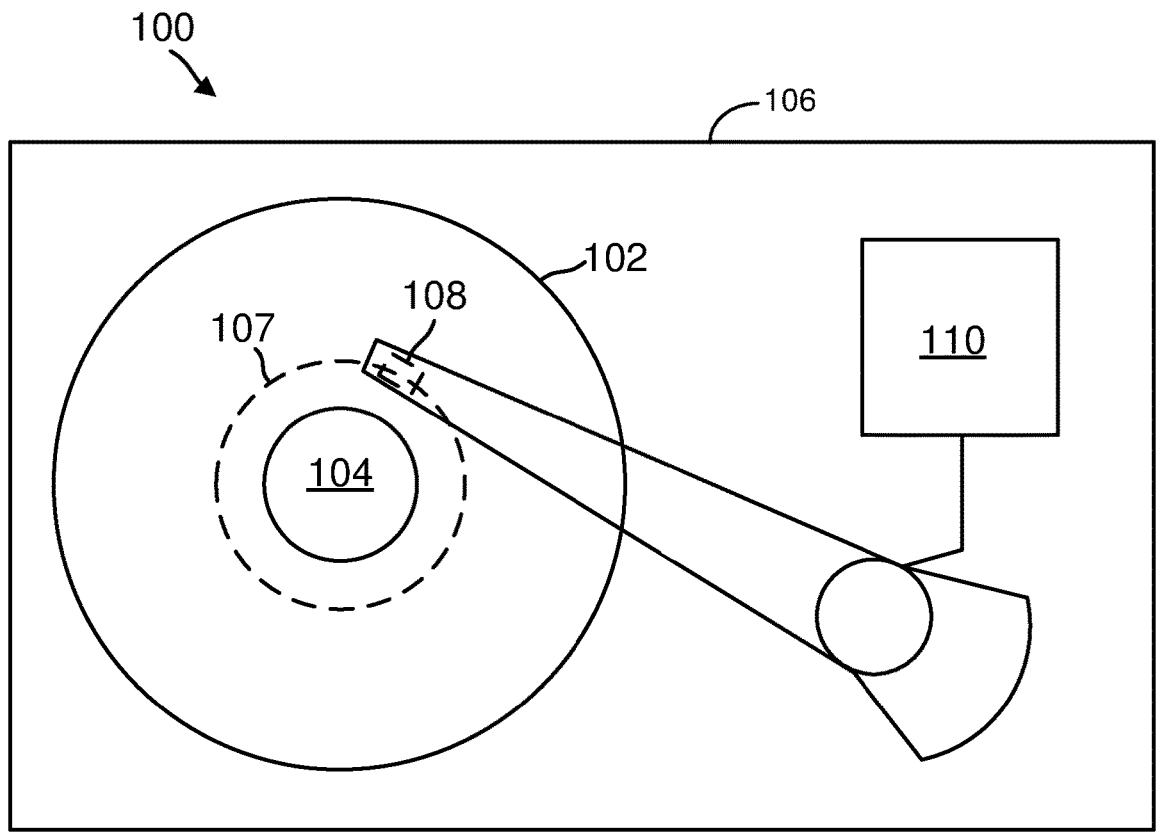
FIG. 1 is a top schematic view of an exemplary data storage device configured for heat-assisted magnetic recording (HAMR) including a slider and a HAMR medium with an etched sacrificial layer and reduced head to media spacing, in accordance with an aspect of the disclosure.

In the following detailed description, reference is made to the accompanying drawings, which form a part thereof. In addition to the illustrative aspects, aspects, and features described above, further aspects, aspects, and features will become apparent by reference to the drawings and the following detailed description. The description of elements in each figure may refer to elements of proceeding figures. Like numbers may refer to like elements in the figures, including alternate aspects of like elements.

The disclosure relates in some aspects to various apparatuses, systems, methods, and media for providing a magnetic recording medium such as a Heat-Assisted Magnetic Recording (HAMR) medium that can, among other features, provide for optimized or at least improved magnetic performance within the HAMR medium. Note that HAMR is a type of Energy-Assisted Magnetic Recording (EAMR), which is a broader term that covers HAMR as well as Microwave Assisted Magnetic Recording (MAMR). At least some aspects of the present disclosure are not limited to HAMR and are applicable to EAMR.

As mentioned in the introduction above, head to media spacing needs to be minimized to achieve acceptable or optimized recording performance in magnetic media. Based on the uneven (e.g., rough) topology of magnetic grains grown at high temperatures for HAMR, challenges exist in reducing roughness at the media surface above the magnetic grains (e.g., media interface). Aspects of this disclosure relate to HAMR media including a sacrificial layer and a capping layer where each of these layers is etched to reduce roughness (e.g., roughness caused by the magnetic grains below) and thereby increase smoothness at the media interface. The sacrificial layer is configured to ensure an etch rate that allows for selective etching (e.g., etching only selected components of the media such as the sacrificial layer and the capping layer, and not etching the magnetic grains). The sacrificial layer may be deposited on the capping layer and after etching (e.g., using plasma etching with a noble gas), may remain along grain boundaries of the capping layer. The remaining portions of the sacrificial layer may form a discontinuous layer including a number of segments positioned along grain boundaries of the capping layer. The sacrificial layer may be made of materials (e.g., a nonmagnetic material) different from the materials of the capping layer or materials of an overcoat layer deposited on the etched capping layer. In one aspect, the sacrificial layer may be embedded in the capping layer at positions corresponding to the grain boundaries, where a top surface of the capping layer (capping grains in particular) and a top surface of the sacrificial layer are substantially coplanar.

Performance testing of HAMR media with a sacrificial layer shows a number of beneficial characteristics as compared to other media designs without the sacrificial layer. For example, testing showed HAMR media with a sacrificial layer to have reduced average roughness of the media surface, no damage to magnetic grain peaks, better signal to noise ratio for read operations (e.g., up to 1.8 decibels (dB) higher), and sufficient glide yield percentage with thinner overcoat layers. The testing showed that other media designs that etch the capping layer without a sacrificial layer damaged magnetic grains (likely by some sort of partial etching) and thereby damaged the recording/magnetic grains, and as a result, lowered magnetic recording performance. In a surprising result, testing showed HAMR media with an etched sacrificial layer did not have damaged magnetic grains, maintained the high intensity of the grain peaks, and as a result, provided better magnetic recording performance than the other media designs.

Illustrative Examples and Embodiments

FIG. 1 is a top schematic view of an exemplary data storage device (e.g., disk drive or magnetic recording device) configured for heat-assisted magnetic recording (HAMR) including a slider 108 and a HAMR medium 102 with an etched sacrificial layer and reduced head to media spacing, in accordance with an aspect of the disclosure. The laser (not visible in FIG. 1 but see 114 in FIG. 2) is positioned with a magnetic head/slider 108. Disk drive 100 may comprise one or more disks/media 102 to store data. Disk/media 102 resides on a spindle assembly 104 that is mounted to a drive housing 106. Data may be stored along tracks in the magnetic recording layer of disk 102. The reading and writing of data is accomplished with the head 108 (slider) that may have both read and write elements (108a and 108b). The write element 108a is used to alter the properties of the magnetic recording layer of disk 102 and thereby write information thereto. In one aspect, head 108 may have magneto-resistive (MR) based elements, such as tunnel magneto-resistive (TMR) elements for reading, and a write pole with coils that can be energized for writing. In operation, a spindle motor (not shown) rotates the spindle assembly 104, and thereby rotates the disk 102 to position the head 108 at a particular location along a desired disk track 107. The position of the head 108 relative to the disk 102 may be controlled by the control circuitry 110 (e.g., a microcontroller). It is noted that while an exemplary HAMR system is shown, at least some aspects of the disclosure may be used in other HAMR or EAMR magnetic data recording systems or in non-HAMR or non-EAMR magnetic data recording systems, including shingle-written magnetic recording (SMR) media, perpendicular magnetic recording (PMR) media, or microwave assisted magnetic recording (MAMR) media.

Figure 2:
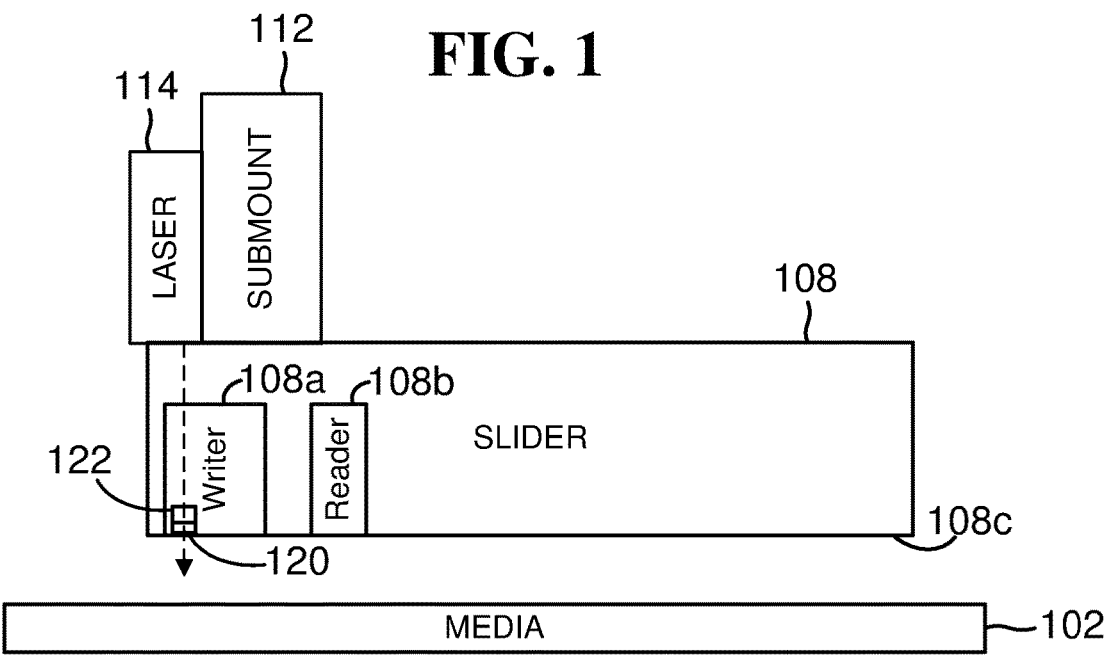
FIG. 2 is a side schematic view of the exemplary slider and HAMR medium of FIG. 1 in accordance with an aspect of the disclosure.

FIG. 2 is a side schematic view of the slider 108 and magnetic recording medium 102 of FIG. 1. The magnetic recording medium 102 includes the etched sacrificial layer and capping layer above the magnetic recording layer (layers not visible in FIG. 2 but see FIGS. 3 and 4). The slider 108 may comprise a sub-mount 112 attached to a top surface of the slider 108. The laser 114 may be attached to the sub-mount 112, and possibly to the slider 108. The slider 108 comprises a write element (e.g., writer) 108a and a read element (e.g., reader) 108b positioned along an air bearing surface (ABS) 108c of the slider for writing information to, and reading information from, respectively, the media 102. In other aspects, the slider may also comprise a layer of Si or Si cladding 120. This layer is optional.

In operation, the laser 114 is configured to generate and direct light energy to a waveguide (e.g., along the dashed line) in the slider which directs the light to a near field transducer (NFT) 122 near the air bearing surface (e.g., bottom surface) 108c of the slider 108. Upon receiving the light from the laser 114 via the waveguide, the NFT 122 generates localized heat energy that heats a portion of the media 102 within or near the write element 108a, and near the read element 108b. The anticipated recording temperature is in the range of about 350° C. to 400° C. In the aspect illustrated in FIG. 2, the laser directed light is disposed within the writer 108a and near a trailing edge of the slider. In other aspects, the laser directed light may instead be positioned between the writer 108a and the reader 108b. FIGS. 1 and 2 illustrate a specific example of a HAMR system. In other examples, the magnetic recording medium 102 can be used in other suitable HAMR systems (e.g., with other sliders configured for HAMR).

Figure 3:
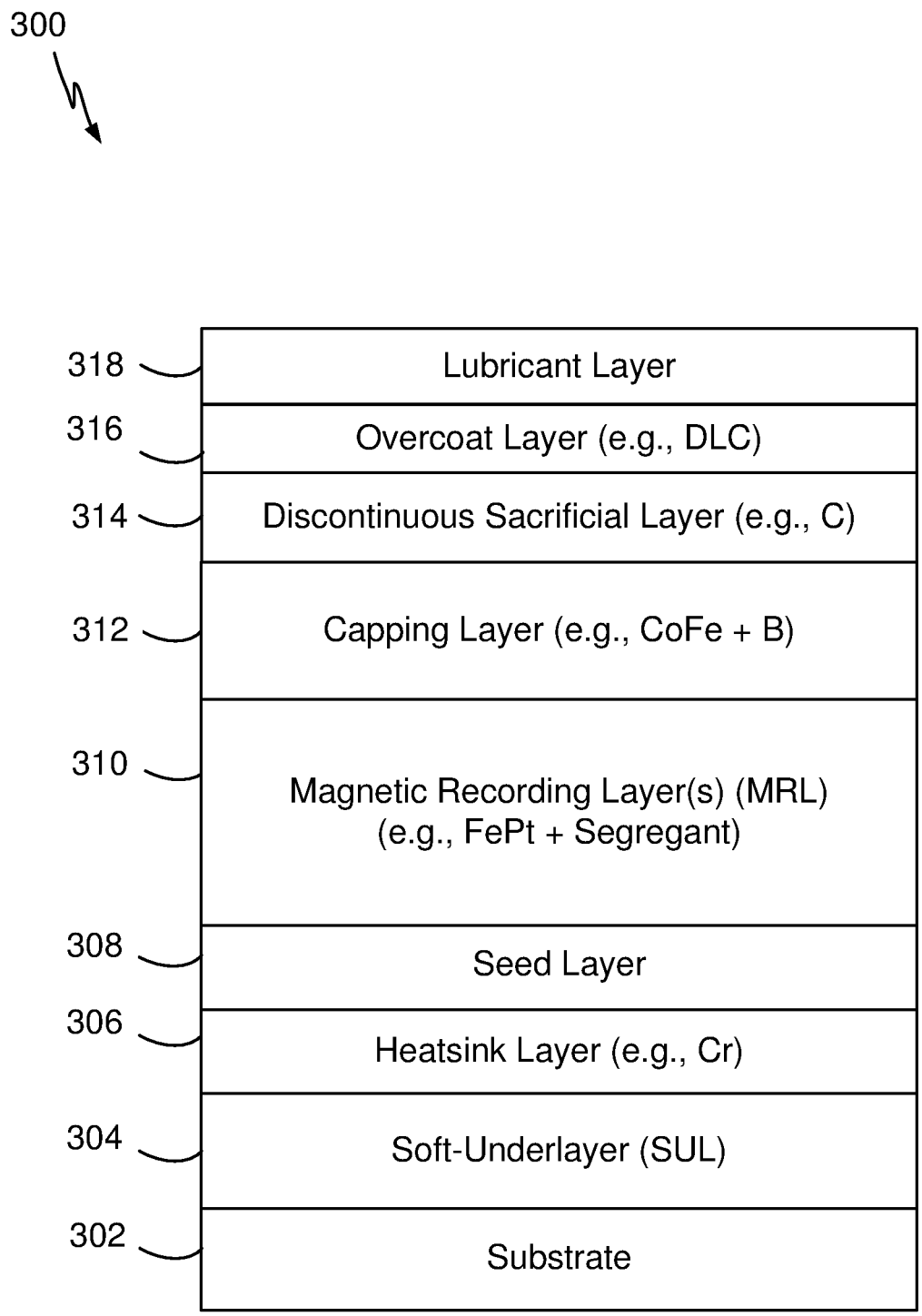
FIG. 3 is a side schematic view of an exemplary HAMR medium that includes, among other layers, a discontinuous sacrificial layer and a capping layer, each etched to reduce head to media spacing in accordance with an aspect of the disclosure.

FIG. 3 is a side schematic view of an exemplary HAMR medium 300 that includes, among other layers, a discontinuous sacrificial layer 314 and a capping layer 312, each etched to reduce head to media spacing in accordance with an aspect of the disclosure. The HAMR medium 300 of FIG. 3 has a stacked structure with a substrate 302 at a bottom/base layer, a soft underlayer (SUL) 304 on the substrate 302, a heatsink layer 306 (which may be formed, e.g., of Cr) on the SUL 304, a seed layer 308 on the heatsink layer 306, a magnetic recording layer (MRL) 310 (which may be formed of magnetic grains (e.g., FePt) and one or more segregants) on the seed layer 308, the capping layer 312 (which may be formed of magnetic materials (e.g., CoFe or CoPt) and one or more segregants) on the MRL 310, the discontinuous sacrificial layer 314 (e.g., made of C or other suitable materials) on the capping layer 312, an overcoat layer 316 (e.g., made of diamond like carbon (DLC) or other suitable materials) on the sacrificial layer 314 (and possibly on the capping layer 312), and a lubricant layer 318 on the overcoat layer 316.

As will described in further detail below, the sacrificial layer 314 was deposited on the capping layer 312 and then etched where both the sacrificial layer 314 and capping layer 312 are etched, and as a result, the sacrificial layer 314 becomes discontinuous such that it consists of a number of segments each positioned along grain boundaries corresponding to grain boundaries established in the MRL 310 between magnetic/recording grains. The sacrificial layer 314 can be made of a non-magnetic material different from the capping layer 312 materials (e.g., different from the capping layer magnetic materials or segregants).

In some aspects, the HAMR medium 300 can include additional layers. In one example, the HAMR medium 300 also includes an adhesion layer (which may be formed, e.g., of NiTa) on the substrate 302 and under the SUL 304. In one example, the HAMR medium 300 also includes a (heatsink) seed layer (which may be formed, e.g., of RuAl) on the SUL 304 and under the heatsink layer 306.

Note that the terms "above," "below," "on," and "between" as used herein refer to a relative position of one layer with respect to other layers. As such, one layer deposited or disposed on, above, or below another layer may be directly in contact with the other layer or may have one or more intervening layers. Moreover, one layer deposited or disposed between layers may be directly in contact with the layers or may have one or more intervening layers.

Figure 4:
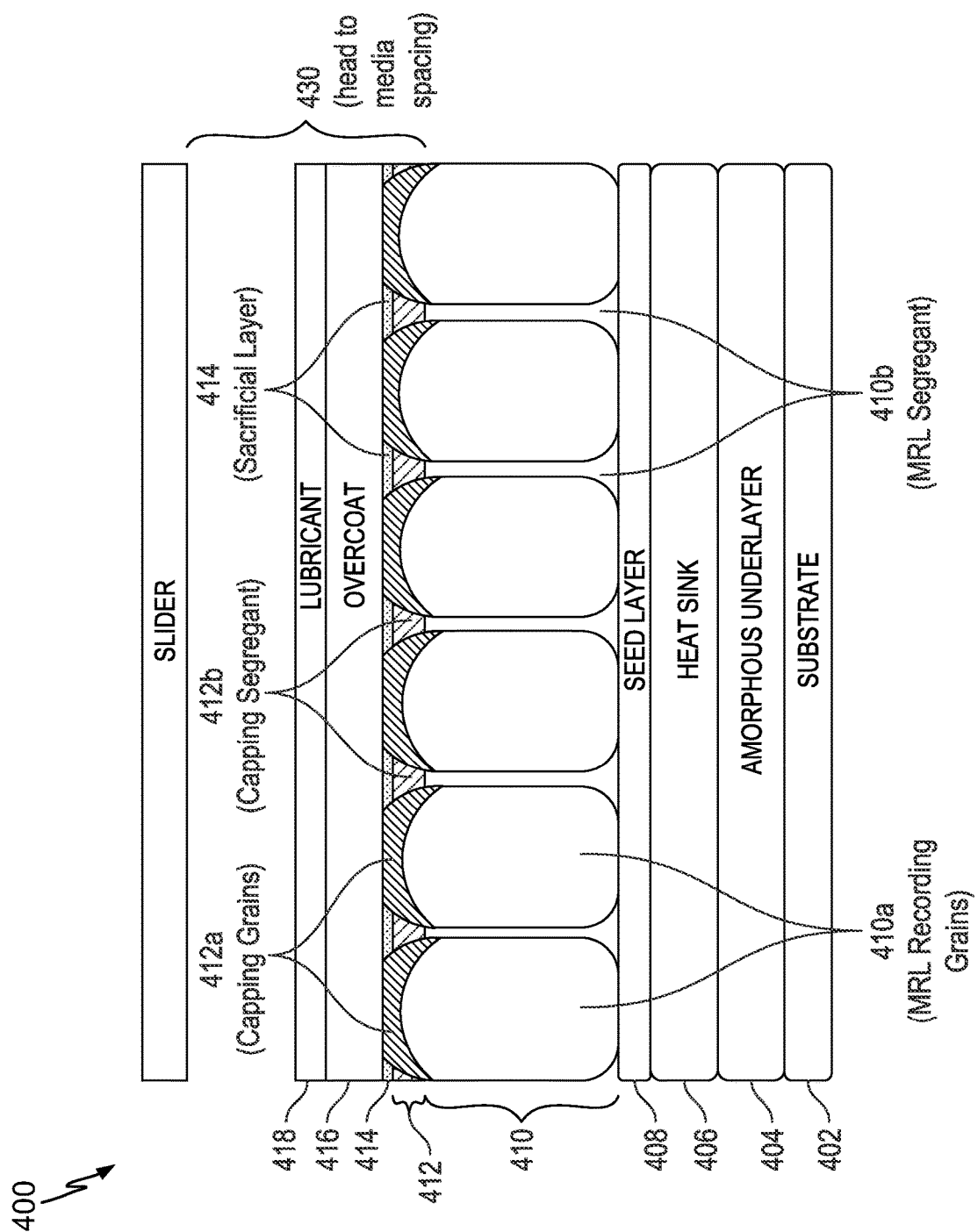
FIG. 4 is a side schematic view of an exemplary HAMR medium that includes, among other layers, a discontinuous sacrificial layer and a capping layer, each etched to reduce head to media spacing and the grain structure of the magnetic recording layer in accordance with an aspect of the disclosure.

FIG. 4 is a side schematic view of an exemplary HAMR medium 400 that includes, among other layers, a discontinuous sacrificial layer 414 and a capping layer 412, each etched to reduce head to media spacing and the grain structure of the magnetic recording layer 410 in accordance with an aspect of the disclosure. Similar to the HAMR medium of FIG. 3, the HAMR medium 400 of FIG. 4 has a stacked structure with a substrate 402 at a bottom/base layer, a soft/amorphous underlayer (SUL) 404 on the substrate 402, a heatsink layer 406 (which may be made, e.g., of Cr) on the SUL 404, a seed layer 408 on the heatsink layer 406, a magnetic recording layer (MRL) 410 (which may be formed of magnetic grains 410a (e.g., FePt) and one or more segregants 410b) on the seed layer 408, the capping layer 412 (which may be formed of magnetic materials 412a (capping grains, e.g., CoFe) on the MRL grains 410a and one or more segregants 412b) on the MRL 410, the discontinuous sacrificial layer 414 (e.g., made of C or other suitable materials) on the capping layer 412, an overcoat layer 416 (e.g., made of diamond like carbon (DLC) or other suitable materials) on the sacrificial layer 414 and on the capping layer grains 412a, and a lubricant layer 418 on the overcoat layer 416.

During media fabrication, the MRL 410 is deposited such that recording grains 410a are formed of one or more magnetic materials (e.g., FePt) and grain boundaries 410b are formed of one or more segregants (e.g., C, BN, $SiO_2$, Ag, or $TiO_2$). It is noted that while the MRL 410 is abstractly drawn as a single layer, it can comprise multiple layers, as shown previously in MRL 310, and in one example, the depicted recording grains 410a and grain segregants 410b can represent the topmost layer of a multilayer MRL structure. The capping layer 412 is then deposited on the MRL 410 such that capping grains 412a are formed of one or more magnetic materials (e.g., CoFe) on the MRL grains 410a and capping boundaries 412b are formed of one or more capping segregants on the MRL segregants 410b. The MRL grains 410a and the capping grains 412a can present a fairly rough upper surface. To decrease the roughness caused by the grain formation, the sacrificial layer 414 is deposited on the capping layer 412 and etched until at least some of the capping grains 412a have been planarized, as shown in FIG. 4. As a result, the tops of the capping grains 412a have been etched to be substantially flat and co-planar with the remaining portions of the sacrificial layer 414, now discontinuous or segmented.

In one aspect, the etching is achieved using a plasma enhanced etching process that uses a noble gas. In one aspect, the remaining sacrificial layer 414 chemically mixes with the capping segregants 412b at the grain boundaries. In one aspect, the remaining sacrificial layer 414 is embedded in the capping layer 412 and more specifically, the capping layer segregant 412b. In one aspect, either of the sacrificial layer 414 or the capping layer 412 has embedded remnants of the noble gas used in the etch process.

In one aspect, the overcoat layer 416 is made of amorphous hydrogenated carbon such as diamond-like carbon (DLC) or non-hydrogenated tetrahedral amorphous carbon (ta-C), and the sacrificial layer 414 is made of C with properties different from the overcoat 416 (e.g., overcoat after etching). For example, DLC can be made of hydrogenated carbon with about 30% sp3 bonded atoms and about 70% sp2 bonded atoms, while the C of the sacrificial layer 414 can be made of about 5% sp3 bonded atoms and about 95% sp2 bonded atoms (e.g., after etching), which is also different from the as-deposited state. In one aspect, for example, the sacrificial layer is deposited with about 70% sp2 bonded atoms which increases to about 95% after etching. In one aspect, the sacrificial layer 414 is made of at least one of C, SiO2, Al2O3, ZrO2, or TiO2. In one aspect, the sp2 percentage is the ratio of sp2/(sp2+sp3) bonds in percentage, while sp3 percentage is the ratio of sp3/(sp2+sp3) bonds in percentage.

In one aspect, each of the sacrificial layer 414 and the capping layer 412 include a remanent of a noble gas used in an etching process, and the noble gas includes at least one of Kr, Ar, or Xe.

In one aspect, a thickness of the sacrificial layer 414 is less than a thickness of the capping layer 412.

In some aspects, a top surface of the capping layer 412 and a top surface of the sacrificial layer 414 are substantially flat (e.g., no more than 5 Å deviation from exactly flat). In one example, the top surfaces of the capping layer 412 and the sacrificial layer 414 are substantially coplanar (e.g., no more than 5 Å deviation from exactly coplanar).

The HAMR medium 400 of FIG. 4 has reduced surface roughness at the capping layer 412 and as a result, the thickness of the overcoat layer 416 and lubricant layer 418 can be reduced to decrease or minimize head to media spacing 430.

In some aspects, the layers in the medium may have the following thicknesses: the substrate 302/402 thickness is in the range of 0.5 millimeters (mm) to 0.635 mm; the SUL 304/404 thickness is in the range of 85 nanometers (nm) to 130 nm; the heatsink layer 306/406 thickness is in the range of 55 nm to 100 nm; the seed layer 308/408 has a thickness is in the range of 1 to 4 nm; the MRL 310/410 thickness is in the range of 8 nm to 11 nm; the capping layer 312/412 thickness is in the range of 1 nm to 3 nm; the sacrificial layer 314/414 is in the range of 0.5 nm to 1.5 nm; the overcoat layer 416 thickness is in the range of 20 Å to 50 Å; the lubricant layer thickness (if provided) is in the range of 6 Å to 9 Å. Otherwise routine experimentation can be used to determine suitable or preferred layer thicknesses and/or suitable or preferred compound percentage concentrations for use within practical HAMR systems based on the particular characteristics of the system, such as its operating temperature, the desired areal density of data, etc.

In some examples, the substrate 302/402 has an outer diameter (i.e., OD) of about 97 mm and a thickness of about 0.5 mm. In other examples, the OD may be 95 mm or 95.1 mm. (Generally speaking, such disks are all referred to as "3.5 inch" disks.) In some aspects, the substrate 302/402 may be made of one or more materials such as an Al alloy, NiP-plated Al, glass, glass ceramic, and/or combinations thereof.

In some aspects, the medium further includes an adhesion layer (which might alternatively be referred to as a pre-seed layer) that is used to reduce delamination of layers or films deposited over the adhesion layer. The adhesion layer may be a metallic alloy, such as NiTa, CrTi, or the like.

In some aspects, the SUL 304/404 can be made of one or more materials, such as Co, Fe, Mo, Ta, Nb, B, Cr, or other soft magnetic materials, or combinations thereof. The SUL 304/404 may include an amorphous compound or combination of Co and Fe (e.g., a CoFe alloy) with the addition of one or more elements from Mo, Nb, Ta, W, and B. The SUL 304/404 may be configured to support magnetization of the magnetic recording layer structure 310/410 during data storage operations. More specifically, the SUL 304/404 may be configured to provide a return path for a magnetic field applied during a write operation.

In some aspects, the medium further includes a (heatsink) seed layer to create a growth template for the subsequently deposited films including the heatsink layer 306/406 and the MRL 310/410. Functional goals for the (heatsink) seed layer include small grain size and good crystallographic texture, both of which may be desirable for good media recording performance.

In some aspects, the heatsink layer 306/406 can be made of one or more materials such as Cr, as shown, or Ag, Al, Au, Cu, Mo, Ru, W, CuZr, MoCu, AgPd, CrRu, CrV, CrW, CrMo, CrNd, NiAl, NiTa, combinations thereof, and/or other suitable materials known in the art.

In some aspects, the medium further includes a thermal resistive layer deposited directly on the heatsink layer 306/406 to provide thermal resistance to the heatsink layer. The thermal resistive layer may be etched to reduce roughness.

In some aspects, the seed layer 308/408 is provided as a seed layer for the MRL 310/410 to provide a thermal barrier and to assist in nucleation so as to permit proper crystal growth within the MRL 310/410 so that the MRL 310/410 will have good crystallographic texture with small grains. The seed layer 308/408 may be made of MgOTiO (MTO) or possibly MgO. In one aspect, the seed layer may be implemented using multiple layers (e.g., multiple MTO layers or combinations of MgO layers and MTO layers).

In some aspects, the MRL 310/410 includes one or more magnetic recording layers (multiple layers not explicitly shown in FIGS. 3 and 4) for storing data magnetically. For example, the MRL 310/410 may include magnetic recording sub-layers and exchange control sub-layers (ECLs). Collectively, the sub-layers form an MRL structure 310/410 that may be, e.g., 100-200 angstroms (Å) thick. In some aspects, the MRL 310/410 may be made of FePt. In some aspects, the MRL 316 may be made instead of an alloy selected from FePtY, where Y is a material selected from Cu, Ni, and combinations thereof. In other aspects, the MRL 310/410 may be made instead of a CoPt alloy. In some aspects, the MRL 310/410 may be formed of high anisotropy $L1_0$ FePt with segregants such as C, BN, $SiO_2$, Ag, TiO2, and/or combinations thereof. In some aspects, the MRL is a four layer MRL. Each layer of the MRL may have segregants with the amount of segregant varying from layer to layer within the MRL.

In some aspects, the capping layer 312/412 may be made of one or more magnetic materials (e.g., Co, Fe, Pt, or Pd) and one or more segregants (e.g., B, BN, TiO2, SiO2, C, or AlN).

In one aspect, the sacrificial layer 314/414 is made of C (e.g., non-hydrogenated carbon as distinguished from hydrogenated carbon such as DLC or carbon films deposited with CVD or sputtered C). In one aspect, the sacrificial layer 314/414 is made of at least one of C, SiO2, Al2O3, ZrO2, or TiO2. With a kinetic energy of about 600 electron-volts (eV), these materials can have etch/sputter rates (in Angstroms per second or Å/s) of 20, 70, 40, 40, 40, respectively. As a reference, the etch/sputter rate for FePt is in the range of 180-200 (Å/s).

In one aspect, the overcoat 316/416 is made of amorphous hydrogenated carbon such as DLC or non-hydrogenated tetrahedral amorphous carbon (ta-C). Either hydrogenated or non-hydrogenated carbon can be used as a material for the sacrificial layer. However, for each case, the remaining sacrificial layer carbon film property after etching processes (such as shown in box 564 of the process of FIGS. 5a-5i), becomes significantly different from the original film as initially deposited. In one aspect, for example, the sacrificial layer is deposited with about 70% sp2 bonded atoms which increases to about 95% after etching.

In some aspects, the lubricant layer may be made of a polymer-based lubricant material.

Note that the terms "above," "below," "on," and "between" as used herein refer to a relative position of one layer with respect to other layers. As such, one layer deposited or disposed on, above, or below another layer may be directly in contact with the other layer or may have one or more intervening layers. Moreover, one layer deposited or disposed between layers may be directly in contact with the layers or may have one or more intervening layers.

Insofar as the processes described herein are concerned, the processes can in some cases perform the sequence of actions in a different order. In another aspect, the process can skip one or more of the actions. In other aspects, one or more of the actions are performed simultaneously. In some aspects, additional actions can be performed. Unless otherwise indicated, the deposition of at least some of the layers can be performed using any of a variety of deposition processes or sub-processes, including, but not limited to physical vapor deposition (PVD), sputter deposition and ion beam deposition, plasma enhanced chemical vapor deposition (PECVD) and other forms of chemical vapor deposition (CVD), low pressure chemical vapor deposition (LPCVD) and atomic layer chemical vapor deposition (ALCVD). In other aspects, other suitable deposition techniques known in the art might also be used.

FIGS. 5a-5i illustrate a sequence of cross-sectional views of a magnetic media workpiece 500, and corresponding actions performed on the magnetic media workpiece 500 in a process for reducing the surface roughness of the magnetic media using selective etching of the sacrificial layer and capping layer in accordance with an aspect of the disclosure.

In FIG. 5a, the process first provides (550) a substrate 502. Substrate 502 could be implemented with any of the substrates 302/402 described above.

In FIG. 5b, the process provides (552) a soft underlayer 504 on the substrate 502. The soft underlayer 504 could be made of any of the materials described above for soft underlayers 304/404. In one aspect, the process deposits the soft underlayer 504 using any of the deposition techniques described above.

In FIG. 5c, the process provides (554) a heat sink layer 506 on the soft underlayer 504. The heat sink layer 506 could be made of any of the materials described above for heat sink layers 306/406. In one aspect, the process deposits the heat sink layer 506 using any of the deposition techniques described above.

In FIG. 5d, the process provides (556) a seed layer 508 on the heat sink layer 506. The seed layer 508 could be made of any of the materials described above for seed layers 308/408. In one aspect, the process deposits the seed layer 508 using any of the deposition techniques described above.

In FIG. 5e, the process provides (558) a magnetic recording layer (MRL) 510 on the seed layer 508. The MRL 510 could be made of any of the materials described above for MRLs 310/410, and can be formed of multiple layers as described above. In one aspect, the process deposits the MRL 510 using any of the deposition techniques described above. In some aspects, the MRL materials include materials that form recording grains 510a and materials that act as segregants 510b between the recording grains (e.g., where the segregants divide and define the recording grains at so called "grain boundaries"). The materials suitable for the recording grains 510a (e.g., FePt) and the segregants 510b (e.g., C, BN, $SiO_2$, AlN, Ag, TiO2) are described above. In one aspect, the segregant is made of BN.

Figure 5F:
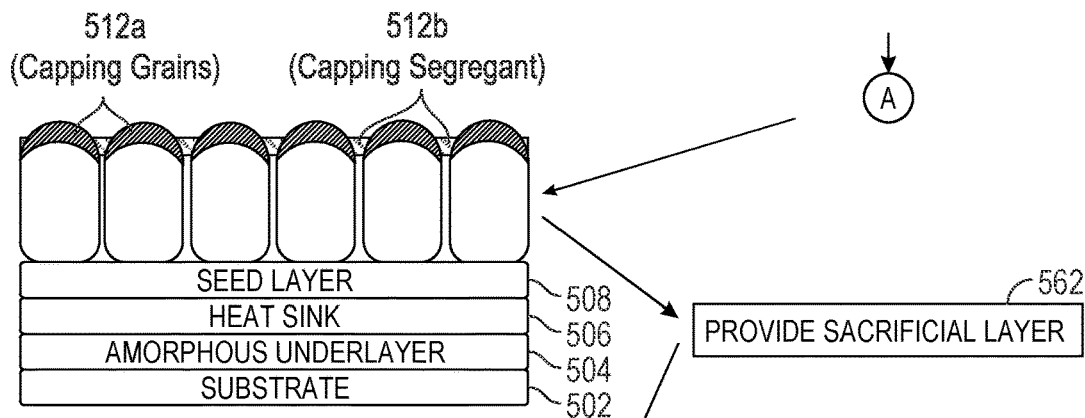

In FIG. 5f, the process provides (560) a capping layer 512 on the MRL 510. The capping layer 512 can include grain materials (e.g., capping grains 512a made of materials that form on or attach to the existing MRL grains 510a) and one or more segregants (e.g., capping segregants 512b that form on the existing MRL segregants 510a). The capping layer 512 could be made of any of the materials described above for capping layers 312/412, including for example, CoFe for the capping grains and B for the capping segregant. In one aspect, the process deposits the capping layer 512 using any of the deposition techniques described above.

Figure 5G:
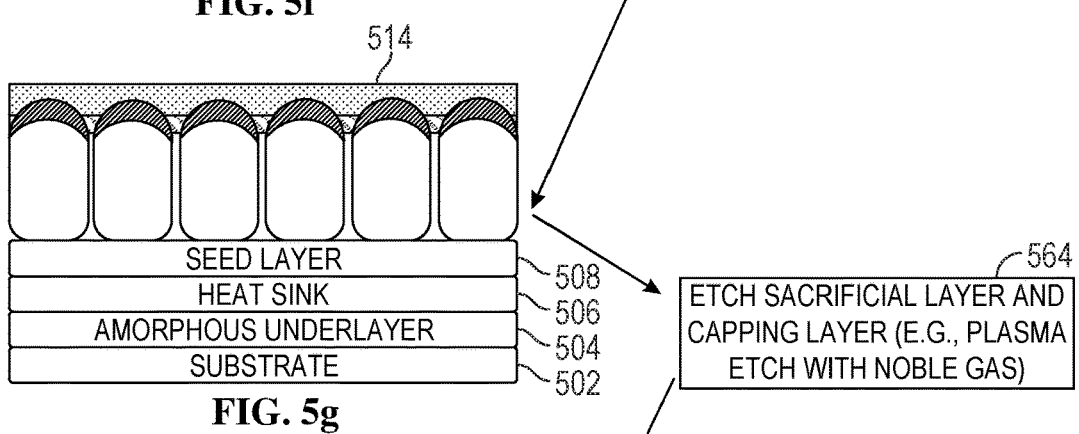

In FIG. 5g, the process provides (562) a sacrificial layer 514 on the capping layer 512. The sacrificial layer 514 can be made of any of the materials described above for sacrificial layers 314/414, including for example, one or more of: non-hydrogenated C, SiO2, Al2O3, ZrO2, or TiO2. In one aspect, the process deposits the sacrificial layer 514 using any of the deposition techniques described above.

Figure 5H:
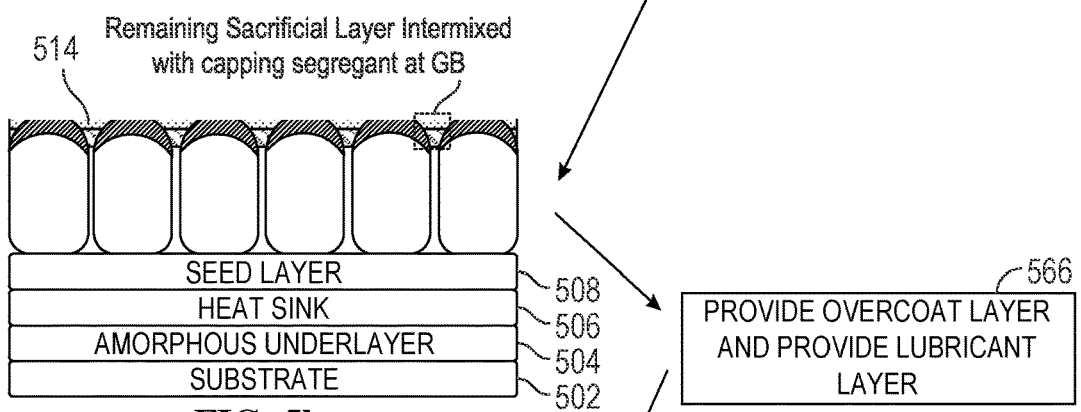

In FIG. 5h, the process etches (564) the sacrificial layer 514 and portions of the capping layer 514. In one aspect, the process performs the etching (564) using a plasma enhanced etching with a noble gas such as one or more of Kr, Ar, or Xe. In one aspect, portions of the sacrificial layer 514 remain, after etching (564), at grain boundaries such that the sacrificial layer 514 becomes discontinuous with segments remaining at the grain boundaries. The capping layer 512, and top portions of the capping grains 512a in particular, are effectively planarized by the etching process. In one aspect, the etching process, and through the use of the sacrificial layer, is carefully tuned (for selective etching) to ensure planarization of the capping grains 512a without etching (or otherwise damaging) the recording grains 510a. In one aspect, the etching (564) involves etching the capping grains 512a but not the capping boundaries (512b). In one aspect, the etching the sacrificial layer and the portions of the capping layer comprises etching the sacrificial layer and the portions of the capping layer such that remaining portions of the sacrificial layer 514 are positioned substantially at the capping boundaries. In one aspect, the remaining portions of the sacrificial layer 514 are intermixed (chemically and/or physically) with the capping segregants 512b at the grain/capping boundaries (e.g., C of sacrificial layer 514 mixes with B or BN of capping segregants 512b).

Figure 5I:
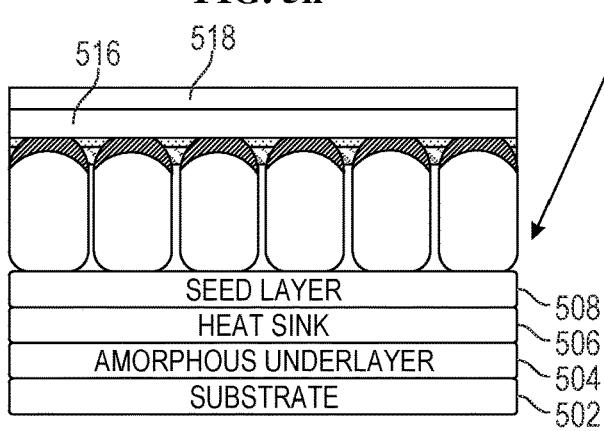

In one aspect, the etching (564) involves etching the sacrificial layer until the sacrificial layer becomes discontinuous and comprises a plurality of segments each positioned at the capping boundaries, as shown for example in FIGS. 5h, 5i and 4.

In one aspect, the etching (564) involves etching the sacrificial layer and the portions of the capping layer but does not include etching the MRL.

In one aspect, the etching (564) involves etching the sacrificial layer and the portions of the capping layer is performed at an etch rate less than 10 Å per second (Å/s).

In one aspect, the etching (564) of the sacrificial layer and the portions of the capping layer results in a planarization of the portions of the capping layer and remaining portions of the sacrificial layer, as shown for example in FIGS. 5h, 5i and 4.

In FIG. 5i, the process provides (566) an overcoat layer 516 on the capping layer 512 and sacrificial layer 514, and then provides (566) a lubricant layer 518 on the overcoat layer 516. The overcoat layer 516 can be made of any of the materials described above for overcoat layers 316/416, including for example, DLC. The lubricant layer 518 can be made of any of the materials described above for lubricant layers 318/418, including for example, a polymer-based lubricant. In one aspect, the process deposits the overcoat layer 516 and/or lubricant layer 518 using any of the deposition techniques described above. In one aspect, the HAMR medium of FIG. 5i is substantially the same as that of FIG. 4.

In one aspect, the overcoat layer is made of diamond like carbon (DLC), and the sacrificial layer is made of C with properties different from the DLC (e.g., DLC is formed of hydrogenated carbon and the sacrificial layer carbon is not hydrogenated).

As noted above, HAMR mediums such as medium 500 or mediums 300/400 may also have additional intervening layers (e.g., such as an adhesion layer, a heatsink seed layer, a thermal resistive layer, etc.).

In one aspect, the process illustrated in FIGS. 5a-5i can be used to fabricate any of the HAMR media described above, including, for example, HAMR mediums 102, 300, 400, and 500.

Note that the terms "above," "below," "on," and "between" as used herein refer to a relative position of one layer with respect to other layers. As such, one layer deposited or disposed on, above, or below another layer may be directly in contact with the other layer or may have one or more intervening layers. Moreover, one layer deposited or disposed between layers may be directly in contact with the layers or may have one or more intervening layers.

Insofar as the processes described herein are concerned, the processes can in some cases perform the sequence of actions in a different order. In another aspect, the process can skip one or more of the actions. In other aspects, one or more of the actions are performed simultaneously. In some aspects, additional actions can be performed. Unless otherwise indicated, the deposition of (or providing of) at least some of the layers can be performed using any of a variety of deposition processes or sub-processes, including, but not limited to physical vapor deposition (PVD), sputter deposition and ion beam deposition, plasma enhanced chemical vapor deposition (PECVD) and other forms of chemical vapor deposition (CVD), low pressure chemical vapor deposition (LPCVD) and atomic layer chemical vapor deposition (ALCVD). In other aspects, other suitable deposition techniques known in the art might also be used.

Figure 6:
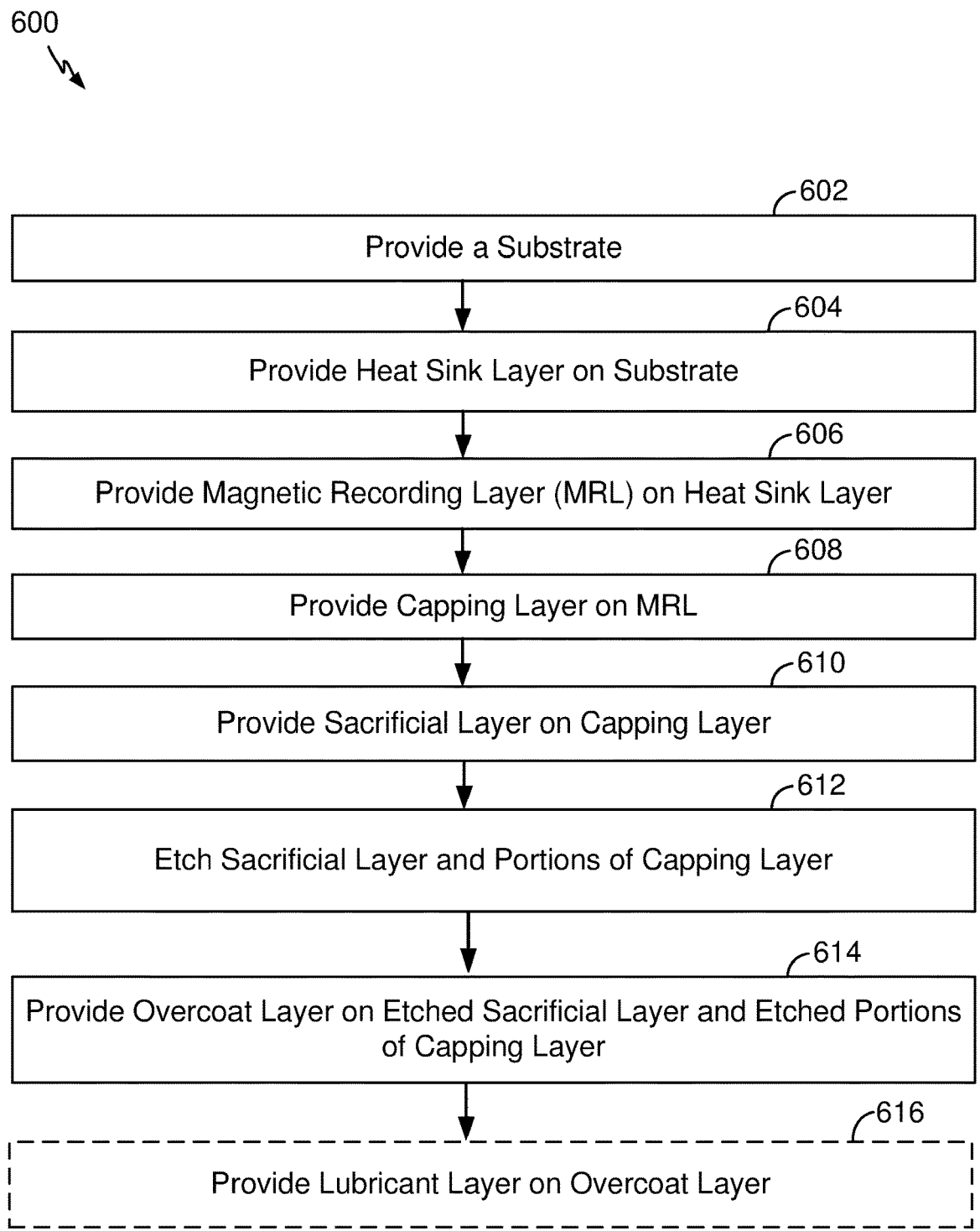
FIG. 6 is a flowchart of an exemplary process for fabricating a HAMR medium that includes a sacrificial layer and a capping layer, where the process etches both the sacrificial layer and the capping layer to reduce roughness, in accordance with an aspect of the disclosure.

FIG. 6 is a flowchart of an exemplary process 600 for fabricating a HAMR medium that includes a sacrificial layer and a capping layer, where the process etches both the sacrificial layer and the capping layer to reduce roughness, in accordance with an aspect of the disclosure. In one aspect, the process 600 can be used to fabricate any of the HAMR media described above, including, for example, HAMR mediums 102, 300, 400, and 500.

At block 602, the process provides a substrate (e.g., 302, 402, 502). At block 604, the process provides a heatsink layer (e.g., 306, 406, 506) on the substrate. In one aspect, the process may additionally provide a soft magnetic underlayer (SUL, e.g., 304, 404, 504) on the substrate and provides the heatsink layer on the SUL. At block 606, the process provides a magnetic recording layer (MRL, e.g., 310, 410, 510) on the heatsink layer. In one aspect, the process may additionally provide a seed layer (e.g., 308, 408, 508) on the heatsink layer and then provides the MRL on the seed layer. At block 608, the process provides a capping layer (e.g., 312, 412, 512) on the MRL.

At block 610, the process provides a sacrificial layer (e.g., 314, 414, 514) on the capping layer. At block 612, the process etches the sacrificial layer (e.g., 314, 414, 514) and the capping layer (e.g., 312, 412, 512). In one aspect, the process etches the capping grains (412a, 512a) but not the capping segregants (412b, 512b). In one aspect, the process etches the sacrificial layer until it becomes discontinuous and comprises multiple segments, each positioned at grain boundaries (e.g., at positions corresponding to the capping segregants). At block 614, the process provides an overcoat layer (e.g., 316, 416, 516) on the etched sacrificial layer and etched portions of the capping layer. In one aspect, the overcoat layer is made of DLC or another suitable overcoat material. At optional block 616, the process provides a lubricant layer (e.g., 318, 418, 518) on the overcoat layer.

In one aspect, the process 600 can include any of the actions illustrated in, or described above for, the process shown in FIGS. 5a-5i.

Note that the terms "above," "below," "on," and "between" as used herein refer to a relative position of one layer with respect to other layers. As such, one layer deposited or disposed on, above, or below another layer may be directly in contact with the other layer or may have one or more intervening layers. Moreover, one layer deposited or disposed between layers may be directly in contact with the layers or may have one or more intervening layers.

Insofar as the processes described herein are concerned, the processes can in some cases perform the sequence of actions in a different order. In another aspect, the process can skip one or more of the actions. In other aspects, one or more of the actions are performed simultaneously. In some aspects, additional actions can be performed. Unless otherwise indicated, the deposition of (or providing of) at least some of the layers can be performed using any of a variety of deposition processes or sub-processes, including, but not limited to physical vapor deposition (PVD), sputter deposition and ion beam deposition, plasma enhanced chemical vapor deposition (PECVD) and other forms of chemical vapor deposition (CVD), low pressure chemical vapor deposition (LPCVD) and atomic layer chemical vapor deposition (ALCVD). In other aspects, other suitable deposition techniques known in the art might also be used.

Figure 7:
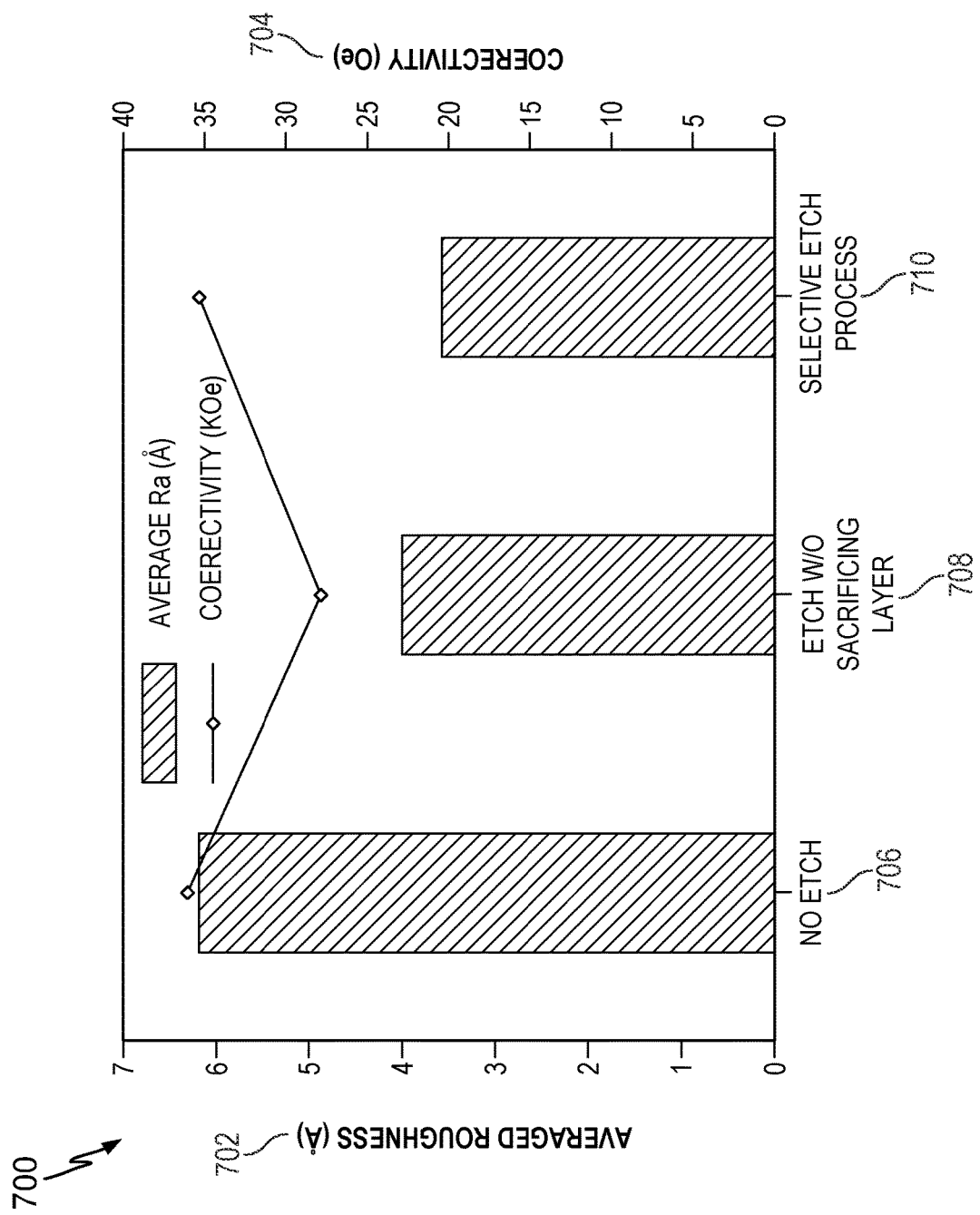
FIG. 7 is a graph showing exemplary average roughness and coercivity values for a first test medium with no sacrificial layer and no etching, a second test medium with a capping layer and etching of the capping layer but without a sacrificial layer, and a third test medium with a sacrificial layer and a capping layer and etching of both the sacrificial and capping layers, in accordance with an aspect of the disclosure.

FIG. 7 is a graph 700 showing exemplary average roughness 702 and coercivity values 704 for a first test medium 706 with no sacrificial layer and no etching, a second test medium 708 with etching of a capping layer but without a sacrificial layer, and a third test medium 710 with a sacrificial layer and a capping layer and etching of both the sacrificial and capping layers, in accordance with an aspect of the disclosure. As can be seen in FIG. 7, the average media surface roughness (measured here in Angstroms or Å) of the third test medium 710 is lower than the average roughness of each of the first test medium 706 and the second test medium 708. In addition, the coercivity (measure in kilo (K) Oersteds (Oe)) of the third test medium 710 remains as high as that provided by the first test medium 706 despite the use of selective etching. On the other hand, the coercivity of the second test medium 708, that includes etching of the capping layer, is reduced as compared to the first or third test mediums. This reduction in coercivity is likely to result in decreased recording performance.

Figure 8:
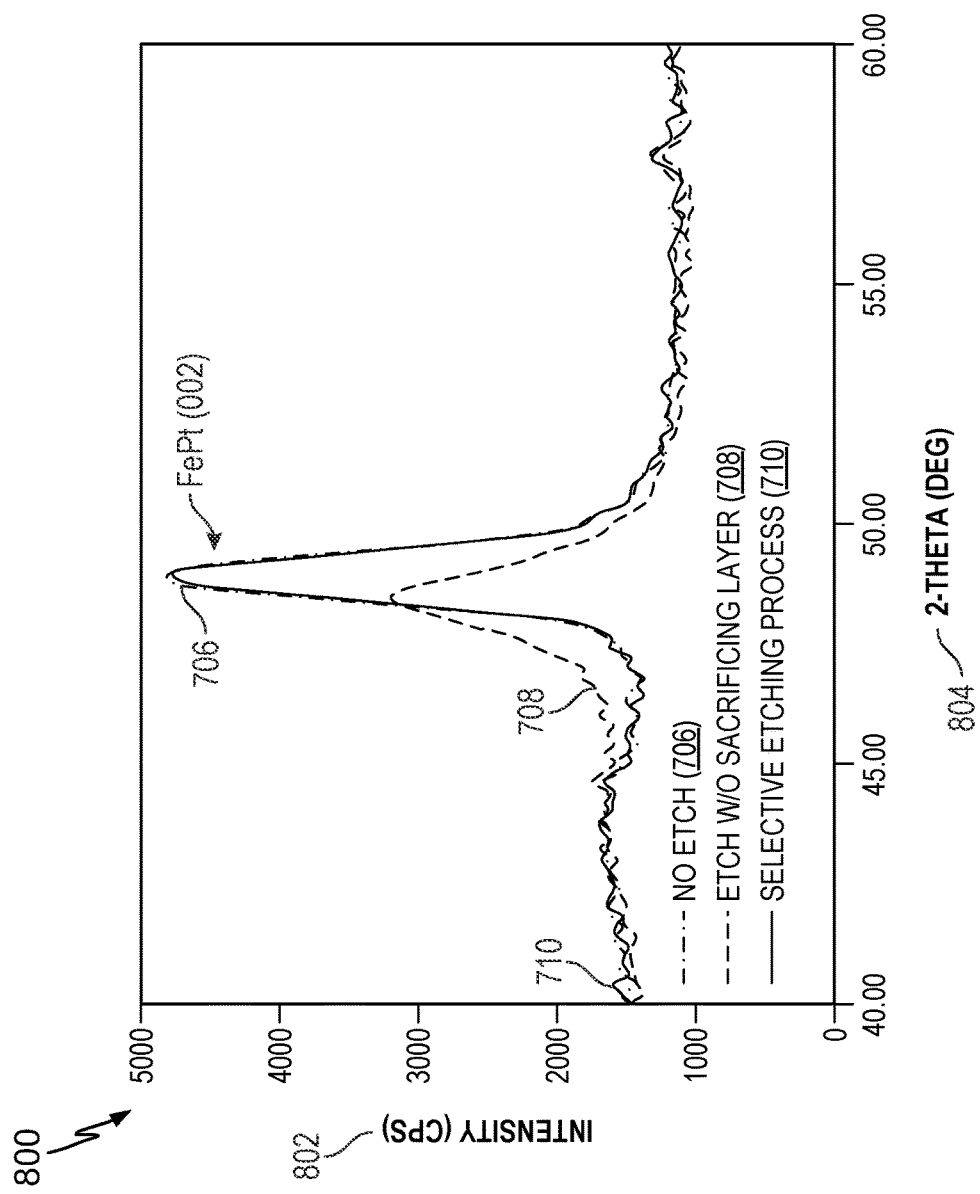
FIG. 8 is a graph showing exemplary X-ray diffraction characterization data, including (002) peak intensities of magnetic grains within each of the same three test mediums of FIG. 7, in accordance with an aspect of the disclosure.

FIG. 8 is a graph 800 showing exemplary X-ray diffraction characterization data, including (002) peak intensities 802 of magnetic grains for the same three test mediums (706, 708, 710) of FIG. 7, in accordance with an aspect of the disclosure. The Y-axis shows the magnetic grain peak intensities 802 measured in counts per second (CPS). The X-axis shows the 2-THETA angle 804 measured in degrees. The 2-THETA angle is the angle between the incoming and diffracted X-ray beam directions, and it is characteristic of the crystal orientations of certain phases. As can be seen in FIG. 8, the first test media 706 with no etching and the third test media 710 that includes a sacrificial layer and selective etching demonstrate high magnetic grain peak intensities (e.g., for magnetic grains formed of FePt with (002) crystal orientation). However, the data for the second test medium 708, that includes etching of the capping layer without a sacrificial layer, illustrates a substantial reduction in grain peak intensity. This reduction in peak intensity is likely to result in decreased recording performance.

Considering now the data of both FIGS. 7 and 8, it was unexpected that the data would show that both coercivity and magnetic grain peak intensities would remain as high for the third test media 710 with selective etch as in the unetched test media (e.g., first test media 706), particularly in view of the data for the second test media 708 (with capping layer etching) which shows substantial reductions in both of those beneficial media characteristics. In other words, the HAMR media with selective etching described herein provides precise etching that results in reductions in media surface roughness while maintaining important magnetic recording characteristics including high grain coercivity and high grain peak intensity. While the reduction in media surface roughness might be expected, the maintenance of relatively high grain coercivity and high grain peak intensity was not expected in view of prior test media that etched the capping layer without a sacrificial layer and showed reduced levels for these performance characteristics.

Figure 9:
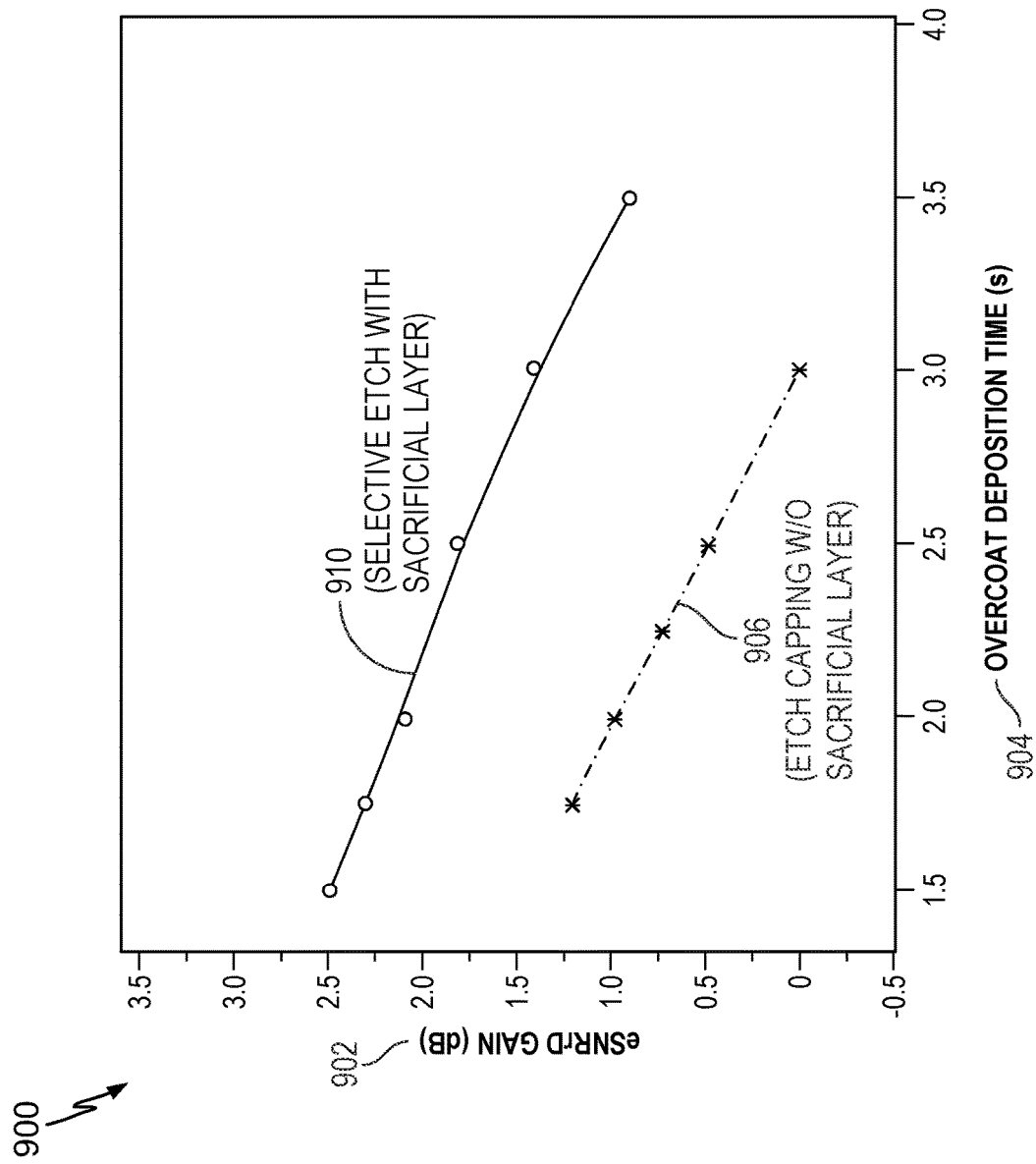
FIG. 9 is a graph showing read signal to noise gain versus overcoat deposition times for a first test medium with no sacrificial layer and etching of a capping layer, a second test medium with a sacrificial layer and a capping layer and etching of both the sacrificial and capping layers, in accordance with an aspect of the disclosure.

FIG. 9 is a graph 900 showing read signal to noise (SNR) gain 902 versus overcoat deposition times 904 for a first test medium 906 with no sacrificial layer and etching of a capping layer, a second test medium 910 with a sacrificial layer and a capping layer and etching of both the sacrificial and capping layers, in accordance with an aspect of the disclosure. In one aspect, the first test medium 906 may correlate to a magnetic medium fabricated using techniques disclosed in U.S. Pat. No. 8,900,465, which may involve etching of a thick carbon layer and then depositing an overcoat on the remaining carbon). The read signal to noise gain 902 is measured in decibels (dB). The overcoat deposition times 904 are measured in seconds (s). The data in graph 900 shows that read SNR gain for the second test medium 910 (with etching of sacrificial layer) was roughly 1 dB higher than that of the first test medium 906 (with no sacrificial layer and etching of capping layer) for overcoat deposition times of about 1.8 seconds, and up to 1.8 dB higher for overcoat deposition times of about 3 seconds. Thus, the read SNR improvement for the second test medium 910 is in the range of 1 to 1.8 dB. While this number may not seem high in the abstract, it results in substantially higher recording performance. For the same reasons as described above, this resulting increase in read SNR was unexpected.

Figure 10:
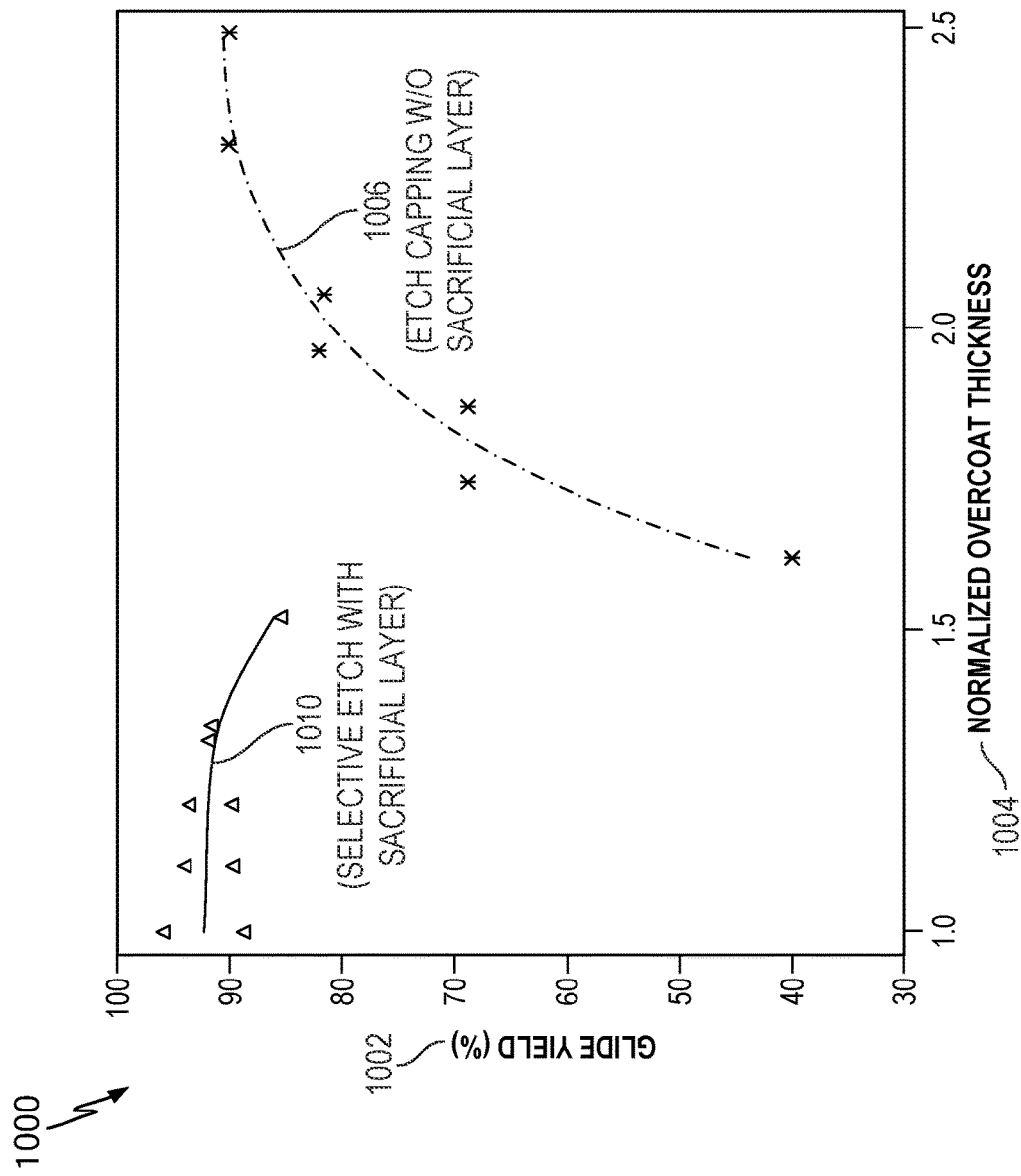
FIG. 10 is a graph showing glide yield versus overcoat layer thickness for a first test medium with no sacrificial layer and etching of a capping layer and a second test medium with a sacrificial layer and a capping layer and etching of both the sacrificial and capping layers, in accordance with an aspect of the disclosure.

FIG. 10 is a graph 1000 showing glide yield 1002 versus overcoat layer thickness 1004 for a first test medium 1006 with no sacrificial layer and etching of a capping layer, and a second test medium 1010 with a sacrificial layer and a capping layer and etching of both the sacrificial and capping layers, in accordance with an aspect of the disclosure. In one aspect, the first test medium 1006 may correlate to a magnetic medium fabricated using techniques disclosed in U.S. Pat. No. 8,900,465, which may involve etching of a thick carbon layer and then depositing an overcoat on the remaining carbon). In glide testing, the media surface of a disk is scanned for asperity defects using a head flying at a fixed flying height over the disk. The disk may be rejected if any defect-driven thermal asperity is detected. The glide yield 1002 is measured in percentage and is the ratio of the number of asperity-free disks to the total number of tested disks, thereby representative of the detected defect level as the head glides over the spinning media, where a desirable higher percentage glide yield is indicative of fewer defects measured at the media surface. The overcoat layer thickness 1004 is normalized.

The data in graph 1000 shows that first test medium 1006 (with no sacrificial layer and etching of capping layer) requires a minimum overcoat thickness of about 2.3 times normalized thickness to obtain a glide yield of 85% (or higher) and has relatively poor/low glide yield in the range of 1.7 to 2.1 times the normalized overcoat thickness. In contrast, the second test medium 1010 (with selective etching of a sacrificial layer and a portion of the capping layer) achieves a glide yield of over 85% with an overcoat layer thickness as small as 1.0 normalized thickness, or anywhere between 1.1 to 1.7 times the normalized thickness. Consequently, FIG. 10 shows that a HAMR medium with selective etching allows for a substantially thinner overcoat layer (e.g., 50% thinner or more). As a result, head to media spacing can be reduced and magnetic recording performance can be increased. In one aspect, the target glide yield can be 85% or higher.

Additional Aspects

The examples set forth herein are provided to illustrate certain concepts of the disclosure. The apparatuses, devices, or components illustrated above may be configured to perform one or more of the methods, features, or steps described herein. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

Aspects of the present disclosure have been described above with reference to schematic flowchart diagrams and/or schematic block diagrams of methods, apparatuses, systems, and computer program products according to aspects of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

The subject matter described herein may be implemented in hardware, software, firmware, or any combination thereof. As such, the terms "function," "module," and the like as used herein may refer to hardware, which may also include software and/or firmware components, for implementing the feature being described. In one example implementation, the subject matter described herein may be implemented using a computer readable medium having stored thereon computer executable instructions that when executed by a computer (e.g., a processor) control the computer to perform the functionality described herein. Examples of computer-readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding aspects. For instance, an arrow may indicate a waiting or monitoring period of unspecified duration between enumerated steps of the depicted aspect.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example aspects. The example systems and components described herein may be configured differently than described. For example, elements may be added to, removed from, or rearranged compared to the disclosed example aspects.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. It is further noted that the term "over" as used in the present application in the context of one component located over another component, may be used to mean a component that is on another component and/or in another component (e.g., on a surface of a component or embedded in a component). Thus, for example, a first component that is over the second component may mean that (1) the first component is over the second component, but not directly touching the second component, (2) the first component is on (e.g., on a surface of) the second component, and/or (3) the first component is in (e.g., embedded in) the second component. The term "about 'value X'", or "approximately value X", as used in the disclosure shall mean within 10 percent of the 'value X'. For example, a value of about 1 or approximately 1, would mean a value in a range of 0.9-1.1. In one aspect, "about" as used herein may instead mean 5 percent. In the disclosure various ranges in values may be specified, described and/or claimed. It is noted that any time a range is specified, described and/or claimed in the specification and/or claim, it is meant to include the endpoints (at least in one embodiment). In another embodiment, the range may not include the endpoints of the range.

While the above descriptions contain many specific aspects of the invention, these should not be construed as limitations on the scope of the invention, but rather as examples of specific aspects thereof. Accordingly, the scope of the invention should be determined not by the aspects illustrated, but by the appended claims and their equivalents. Moreover, reference throughout this specification to "one aspect," "an aspect," or similar language means that a particular feature, structure, or characteristic described in connection with the aspect is included in at least one aspect of the present disclosure. Thus, appearances of the phrases "in one aspect," "in an aspect," and similar language throughout this specification may, but do not necessarily, all refer to the same aspect, but mean "one or more but not all aspects" unless expressly specified otherwise.

The terminology used herein is for the purpose of describing particular embodiments only and is not intended to be limiting of the embodiments. As used herein, the singular forms "a," "an" and "the" are intended to include the plural forms as well (i.e., one or more), unless the context clearly indicates otherwise. An enumerated listing of items does not imply that any or all of the items are mutually exclusive and/or mutually inclusive, unless expressly specified otherwise. It will be further understood that the terms "comprises," "comprising," "includes" "including," "having," and variations thereof when used herein mean "including but not limited to" unless expressly specified otherwise. That is, these terms may specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Various components described in this specification may be described as "including" or made of certain materials or compositions of materials. In one aspect, this can mean that the component consists of the particular material(s). In another aspect, this can mean that the component comprises the particular material(s).

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may include one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

What is claimed is:

1. A magnetic recording medium comprising:
a substrate;
a heat sink layer on the substrate;
a magnetic recording layer (MRL) on the heat sink layer, the MRL comprising a plurality of recording grains separated by a segregant at grain boundaries of the plurality of recording grains;
a capping layer on the MRL and comprising a magnetic material at positions corresponding to the plurality of recording grains and a capping segregant at positions corresponding to the grain boundaries; and
a sacrificial layer embedded in the capping layer at positions corresponding to the grain boundaries, the sacrificial layer comprising a non-magnetic material different from the capping segregant;
wherein a top surface of the capping layer and a top surface of the sacrificial layer are substantially coplanar; and
wherein the sacrificial layer is on the capping segregant and both the sacrificial layer and the capping segregant are in contact with the magnetic material of the capping layer.

2. The magnetic recording medium of claim 1, further comprising:
an overcoat layer on the capping layer; and
a lubricant layer on the overcoat layer.

3. The magnetic recording medium of claim 2:
wherein the overcoat layer comprises amorphous carbon with a first percentage of sp2-bonded atoms; and
wherein the sacrificial layer comprises C with a second percentage of sp2-bonded atoms greater than the first percentage of sp2-bonded atoms.

4. The magnetic recording medium of claim 1, wherein the sacrificial layer comprises at least one of: C, SiO2, Al2O3, ZrO2, or TiO2.

5. The magnetic recording medium of claim 1:
wherein each of the sacrificial layer and the capping layer comprise a remanent of a noble gas used in an etching process; and
wherein the noble gas comprises at least one of: Kr, Ar, or Xe.

6. The magnetic recording medium of claim 1, wherein a thickness of the sacrificial layer is less than a thickness of the capping layer.

7. The magnetic recording medium of claim 1, wherein the top surfaces of the capping layer and the sacrificial layer are substantially flat such that the roughness is less than about 8 Angstroms.

8. The magnetic recording medium of claim 7, wherein the top surfaces of the capping layer and the sacrificial layer are substantially flat as a result of a planarization process applied thereto.

9. A magnetic recording medium comprising:
a substrate;
a heat sink layer on the substrate;
a magnetic recording layer (MRL) on the heat sink layer, the MRL comprising a plurality of recording grains separated by a segregant at grain boundaries of the plurality of recording grains;
a capping layer on the MRL and comprising a magnetic material disposed on each of the plurality of recording grains and another material disposed at the grain boundaries;
a discontinuous sacrificial layer comprising a plurality of segments, each on the capping layer at positions corresponding to the grain boundaries, the sacrificial layer comprising a material different from the materials of the capping layer;

an overcoat layer on the capping layer; and a lubricant layer on the overcoat layer;

wherein each of the plurality of segments of the discontinuous sacrificial layer and the another material disposed at the grain boundaries of the capping layer are in contact with the magnetic material of the capping layer.

10. The magnetic recording medium of claim 9:

wherein a top surface of the capping layer and a top surface of the sacrificial layer are substantially flat such that the roughness is less than about 8 Angstroms; and wherein the op surfaces of the capping layer and the sacrificial layer are substantially coplanar.

11. The magnetic recording medium of claim 10, wherein the top surfaces of the capping layer and the sacrificial layer are substantially flat as a result of a planarization process applied thereto.

12. The magnetic recording medium of claim 9:

wherein the overcoat layer comprises amorphous carbon with a first percentage of sp2-bonded atoms; and wherein the sacrificial layer comprises C with a second percentage of sp2-bonded atoms greater than the first percentage of sp2-bonded atoms.

13. The magnetic recording medium of claim 9, wherein the sacrificial layer comprises at least one of: C, SiO2, Al2O3, ZrO2, or TiO2.

14. The magnetic recording medium of claim 1, fabricated using a method comprising:

providing the substrate;

providing the heat sink layer on the substrate;

providing the magnetic recording layer (MRL) on the heat sink layer;

providing the capping layer on the MRL;

providing the sacrificial layer on the capping layer;

etching the sacrificial layer and portions of the capping layer; and providing an overcoat layer on the etched sacrificial layer and the etched portions of the capping layer.

15. The magnetic recording medium of claim 14, wherein the etching the sacrificial layer and the portions of the capping layer comprises etching the sacrificial layer and the portions of the capping layer such that remaining portions of the sacrificial layer are positioned substantially at the positions corresponding to the grain boundaries.

16. The magnetic recording medium of claim 14, wherein the etching the sacrificial layer and the portions of the capping layer does not include etching the MRL.

17. The magnetic recording medium of claim 14, wherein the etching the sacrificial layer and the portions of the capping layer is performed at an etch rate less than 10 Angstroms per second.

18. The magnetic recording medium of claim 14, wherein the etching the sacrificial layer and the portions of the capping layer results in a planarization of the portions of the capping layer and remaining portions of the sacrificial layer.

19. The magnetic recording medium of claim 14, wherein the method further comprises:

providing a lubricant layer on the overcoat layer;

wherein the overcoat layer comprises amorphous carbon with a first percentage of sp2-bonded atoms; and wherein the sacrificial layer comprises C with a second percentage of sp2-bonded atoms greater than the first percentage of sp2-bonded atoms.

\* \* \* \* \*